Jan. 9, 1951   M. E. SCHLENKER ET AL   2,537,093
SHADED POLE ELECTRIC MOTOR
Filed April 13, 1949   2 Sheets-Sheet 1
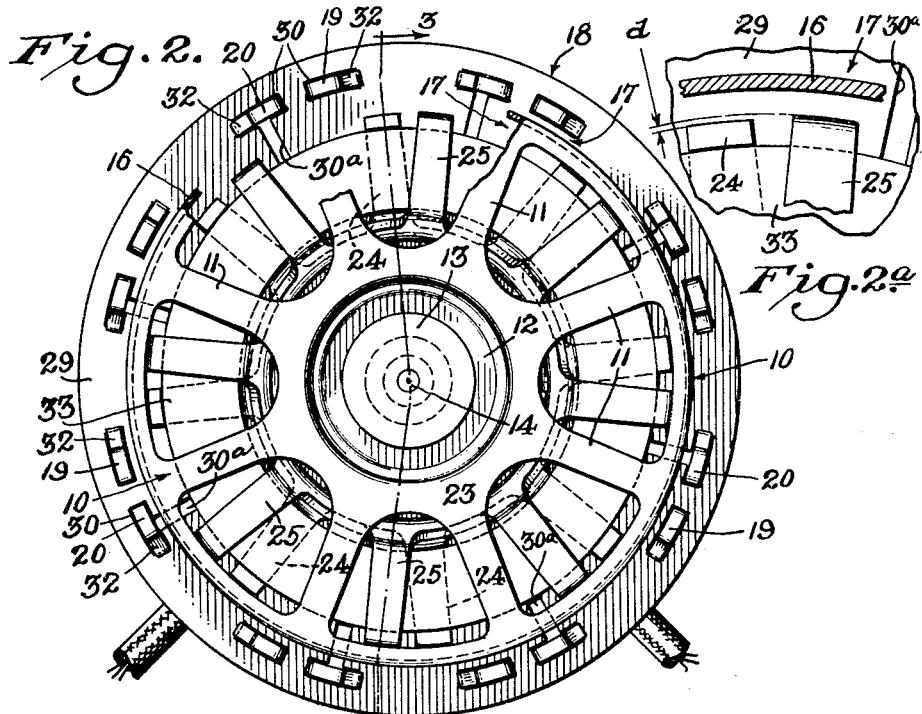
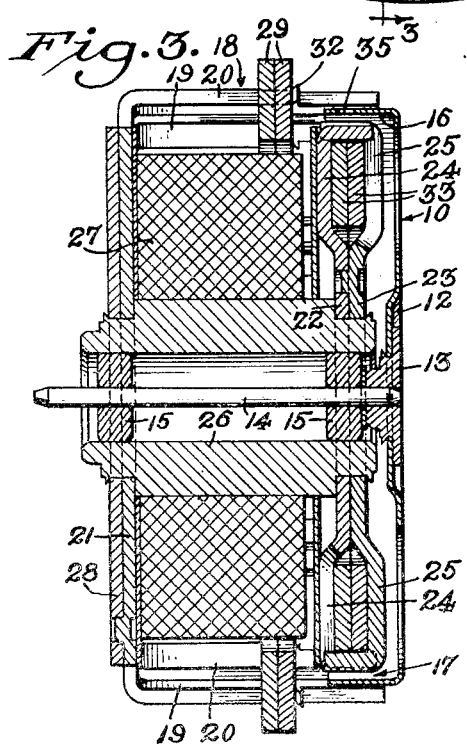
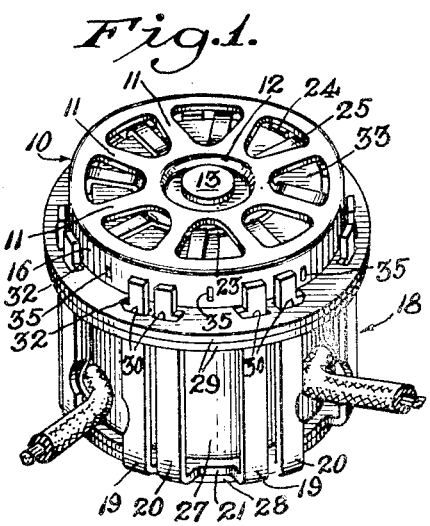
Inventors
Max E. Schlenker
Paul W. Ryburn
BY
Attorney Jan. 9, 1951 M. E. SCHLENKER ET AL 2,537,093
SHADED POLE ELECTRIC MOTOR
Filed April 13, 1949 2 Sheets-Sheet 2
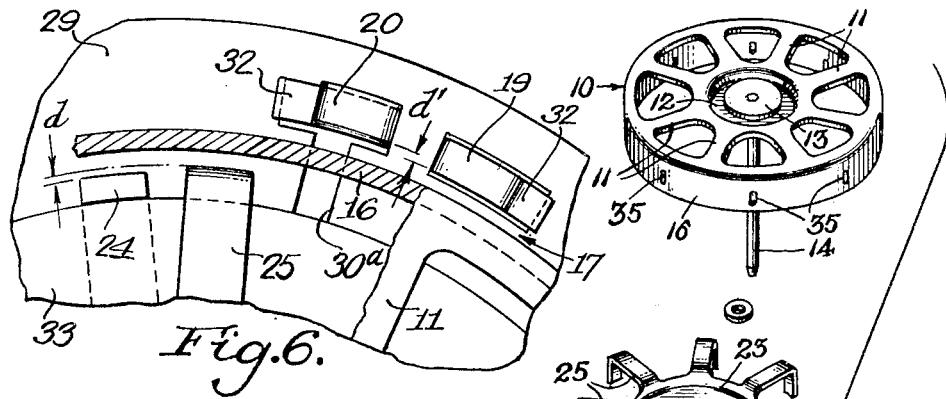
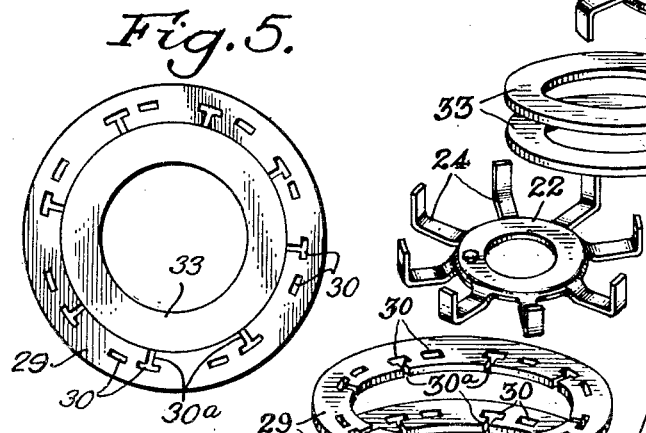
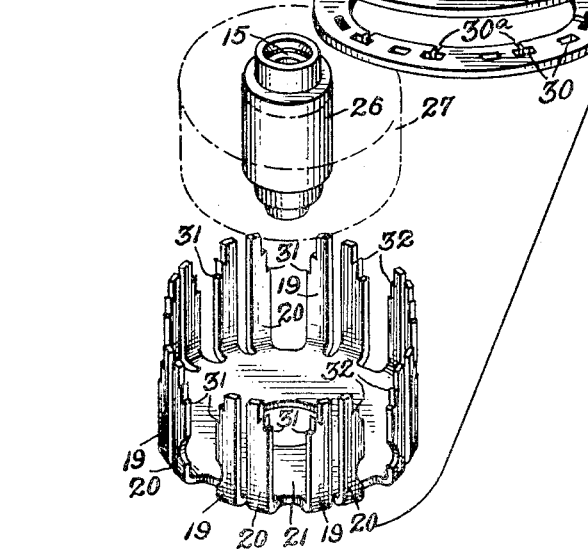
Inventors
Max E. Schlenker
Paul W. Ryburn
BY
Attorney Patented Jan. 9, 1951

2,537,093

UNITED STATES PATENT OFFICE 2,537,093

SHADED POLE ELECTRIC MOTOR

Max E. Schlenker, Peru, Ill., and Paul W. Ryburn, Akron, Ohio, assignors to General Time Corporation, a corporation of Delaware Application April 13, 1949, Serial No. 87,196

11 Claims. (Cl. 172—278)

The invention pertains to shaded pole electric motors and in most of its aspects has particular utility as applied to synchronous motors with hysteresis type rotors.

This application is a continuation in part of application Serial No. 568,311 filed December 15, 1944, now abandoned.

The general aim of the present invention is to provide a novel motor of the class indicated which affords both production economy and good operating characteristics.

More particularly, an object of the invention is to provide such a motor embodying a novel and economical arrangement for effecting differential spacing of the shaded and unshaded portions of the stator pole pieces with reference to the rotor.

Another object is to provide such a motor embodying a novel shading ring construction, such as to minimize the wastage of material during fabrication.

The invention also resides in various novel constructions and correlations of the motor elements utilized in achieving the general aim of the invention set forth above.

Further objects and advantages of the invention wi'l become apparent as the following description proceeds, taken in connection with the accompanying drawings in which:

Figure 1 is a perspective view of a shaded pole electric motor embodying the present invention.

Fig. 2 is an enlarged plan view of the motor of Fig. 1, and with a portion of the rotor broken away to expose certain ones of the stator pole pieces.

Fig 2a is a fragmentary detail view showing on somewhat exaggerated scale the differential spacing of the inner series of pole piece fingers with reference to the skirt of the rotor.

Fig. 3 is an enlarged transverse, or axial, sectional view of the motor of Fig. 1.

Fig. 4 is an exploded perspective view of the motor of Fig. 1.

Fig. 5 is a detail plan view of two of the shading rings included in the motor, such rings being shown as removed from the motor assembly and disposed concentrically in the relation which they occupy during blanking out of the same.

Fig. 6 is a fragmentary detail view of a modified form of the motor showing differential spacing of both the outer and inner pairs of pole pieces with reference to the skirt of the rotor.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring more particularly to the exemplary embodiment of the invention herein illustrated, the motor shown is a self-starting, shaded pole, synchronous motor employing a hysteresis type rotor 10, and is adapted for operation from a single phase source of alternating current such, for example, as an ordinary 60 cycle 110 volt system. The rotor 10 has the shape of an inverted snallow cup, being die-formed from steel having high remanence. Preferably cutouts are made in the top of the rotor to define a plurality of spokes 11, here shown as eight in number. The central portion of the rotor is dished as indicated at 12 (see Fig. 3) and is staked to a hub 13 on a central motor shaft or arbor 14 journaled in bearings 15.

The rotor 11 has an active annular skirt portion 16 which is received in an annular rotor recess 17 defined by two respective inner and outer annular series of pole piece tips (details of the construction for which appear below) on the motor stator, the latter being designated generally as 18. A maximum number of stator poles, consistent with small overall dimensions, is desirable in order to minimize the synchronous speed, the latter being inherently a function of the number of poles and the frequency of supply current.

The illustrated stator 18 affords 16 poles, eight in the outer series bordering the exterior of the rotor recess 17, and a like number bordering the inner side of such rotor recess. Each of the outer series of poles in constituted by a pair of fingers 19, 20 on a disk-shaped pole piece 21 (see Fig. 4). Each pole is divided into two such fingers or portions to facilitate partial shading of each pole face, one finger in each pair being shaded and the other left unshaded in a manner which will shortly appear. The inner series of poles is, on the other hand, constituted by two disk-shaped pole pieces 22, 23 having respective radial fingers 24, 25 arranged with one of the fingers 24 paired with each of the fingers 25 to form inner poles at points intermediate each of the successive poles in the outer series.

The pole pieces 21, 22 and 23 are all die-formed from magnetizable materials such, for example, as soft iron, and are fixed to a central core or sleeve 26 (Figs. 3 and 4) of like material in which the shaft bearings 15 are mounted. A single field winding 27 for the motor encircles the core 26. The end portions of the core are reduced in diameter, the pole piece 21 and a supplemental iron disk 28 underlying the same being fixed to one end of the core, and to the other two pole pieces 22, 23 being fixed to the opposite end in face-to-face relation with each other.

The pole fingers 19, 20 on the pole piece 21 are bent upward to extend in substantial parallelism with the core axis along the exterior of the winding 27. A pair of duplicate shading rings 29, apertured at circumferentially spaced points 30 to receive the fingers 19, 20 are slipped down over such fingers. Two such duplicate shading rings, rather than a single one of a thickness equal to the two, are employed merely because the use of the lighter gauge stock facilitates stamping them out. These rings 29 are die-formed from sheet copper or other non-magnetic metal having high electrical conductivity. The flat-faced rings thus formed have maximum rigidity in the plane of the same so that they afford a good lateral reenforcement for the fingers 19, 20 and aid in locating the latter in precisely spaced relation with reference to the rotor skirt 16. The rings 29 are pressed down against locating shoulders 31 (see Fig. 4) on the fingers 19, 20 and angular projections 32 on such fingers are pressed outward after the rings are in place to stake the latter in position. In order that only the fingers 19, out of each of the pairs of fingers 19, 20, shall be shaded, notches 30a are provided in the rings 29, such notches extending from the inner edge of the ring to the ones of the apertures 30 which receive the fingers 20. An electric circuit is thus established through the rings 29 only about the fingers 19 for shading the same, and in consequence half the area of each pole afforded by the tip portions of the pairs of fingers 19, 20 presented to the rotor periphery is shaded.

Provision is also made for shading one finger out of each of the pairs of pole piece fingers constituting the inner annulus of poles presented to the rotor. For that purpose shading rings 33 of plain annular shape, also fashioned from copper or the like, are arranged to shade the pole piece fingers 25 on the pole piece 23 and with the companion fingers 24 on the pole piece 22 remaining unshaded. As in the case of the shading rings 29, two duplicate shading rings 33 are employed, and for the same reasons. Such shading rings 33 are interposed between the sets of radially extending fingers 24, 25 with the fingers 24 underlying the same and the fingers 25 overlying the rings, the tip portions of all of the fingers 24, 25 being bent about the periphery of the rings 33 so as to be presented in an annulus to the inner side of the rotor skirt 16. With such an arrangement the orbital path of the flux traversing the fingers 25 links the shading rings 33 so that these fingers are shaded, whereas the orbital path of the flux traversing the fingers 24 does not link the rings 33, wherefore these latter fingers remain unshaded. Thus, when the winding 27 is energized, flux is caused to flow in an orbital path extending axially of the core 26, outward through the fingers 24, 25, across the rotor recess 17 through the rotor skirt 16, and thence downward through the fingers 19, 20 to the lower end of the core, or vice versa, depending upon the direction of current through the winding.

The particular form and relative dimensions illustrated for the shading rings 29, 33 are such as to minimize the cost of the motor. The rings 33 have an outside diameter substantially equal to, or slightly less than, the interior diameter of the rings 29 (see Fig. 5). Accordingly, the rings 33 may be die-formed from what would otherwise be a waste disk blanked out from the center of the rings 29. The amount of copper scrap is thus materially reduced.

As best shown in Fig. 2, the stator poles constituted by the tip portions of the fingers 24, 25 are arranged intermediate successive ones of the outer series of poles formed by the tip portions of the fingers 19, 20. The shaded and unshaded portions of the inner and outer series of poles alternate, of course, in the same direction circumferentially of the rotor. Thus, as illustrated, the shaded fingers 19 in the outer series are placed ahead of or lead the unshaded fingers 20 in a clockwise direction, and, similarly, the shaded fingers 25 are placed ahead of or lead the unshaded fingers 24. Consequently, when the winding 27 is energized with alternating current, a rotating magnetic field is set up in the rotor recess 17 which progresses or rotates in a clockwise direction. It is this field which reacts on the hysteresis type rotor 10 in a well-known manner to cause the same to start rotation upon application of current and thereafter revolve at a synchronous speed determined, as heretofore noted, by the number of poles and frequency of the supply current.

The magnitude of the synchronous torque produced has been found to vary in accordance with the relative displacement of the shaded and unshaded portions of the several poles from the rotor. By locating the shaded fingers 25, with their active tip portions, approximately 0.01 inch closer to the rotor skirt 16 than the tips of the unshaded fingers 24, the synchronous torque can be very substantially increased.

It is preferred to provide the differential spacing of shaded and unshaded pole portions with reference to the rotor in the half of the poles comprising the inner series of the same rather than the outer series, where only one series is to be provided with differential spacing, since the illustrated construction is such as to make possible achievement of that differential without resorting to precision grinding or other similar expensive machining operations. What is done is to fashion the die-formed top pole piece 23 with its fingers 25 from sheet metal stock which is of slightly heavier gauge than that from which the companion pole piece 22 with its fingers 24 is formed, the difference in thickness for the two stocks being equal to the differential in spacing which is desired. For example, the pole piece 23 with its fingers 25 may be stamped out of stock 0.05 inch thick and the pole piece 22 with its fingers 24 out of stock 0.04 inch thick. Then when the tips of the fingers 24, 25 are bent in such shapes as to embrace the peripheral edge of the shading rings 33, the active outer face of the tips on the shaded fingers 25 will lie closer to the rotor skirt 16 than the faces of the tips of the unshaded fingers 24 by a distance $d$ (see Fig. 2a) which is equal to the difference in thickness of the stock from which the fingers 24, 25 are respectively fashioned. With the dimensions suggested in the example above, $d$ would be equal to 0.01 inch.

In addition to providing differential spacing for the inner pole portions we have found it possible to gain increased synchronous torque by providing similar differential spacing for the outer pole portions. As shown in Fig. 6, the unshaded pole fingers 20 are bent away from the rotor so that they lie further from the rotor skirt 16 than the shaded poles by a distance $d^1$. For the motor described the best results have been obtained with $d^1$ equalling approximately 0.01 inch.

To provide differential spacing of the outer pole fingers of the motor it is necessary to bend said poles in a jig. Thus to make the motor shown in Fig. 6 requires an additional operation over the motor shown in Figs. 1–5. For most applications, the motor shown in Figs. 1–5 will be found satisfactory, but the motor shown in Fig. 6 will provide more synchronous torque and, therefore, the additional operation is warranted when maximum synchronous torque is desired.

As a means of further increasing the synchronous torque of the motor with a disproportionately small sacrifice in starting torque, the skirt 16 of the rotor is preferable apertured. For that purpose small apertures or holes 35 may be pierced in the skirt. As illustrated, such holes are preferably placed at equal intervals about the periphery of the rotor and are equal in number to one-half the total number of poles.

We claim as our invention:

1. In an electric motor, a field structure presenting an annular series of pairs of sheet metal pole piece fingers bordering a rotor recess and disposed with their tip portions in edge-to-edge relation to each other in a direction circumferential of the series, one finger in each pair being fashioned from sheet metal of a heavier gauge than that from which the other finger in such pair is fashioned, and all of said fingers being positioned with the inner faces of said tip portions lying in a single circle, whereby the outer face of said tip portion of each of the fingers fashioned from said heavier gauge metal is displaced into said rotor recess with reference to the companion finger in its pair by an increment equal to the difference in thickness of fingers.

2. In an electric motor, a field structure presenting an annular series of pairs of sheet metal pole piece fingers bordering a rotor recess and disposed with their tip portions in edge-to-edge relation to each other in a direction circumferential of the series, one finger in each pair being fashioned from sheet metal which is thicker than that from which the other finger in such pair is fashioned by an amount of the order of 0.01 inch, and all of said fingers being positioned with the inner faces of said tip portions lying in a single circle, whereby the outer face of said tip portion of each of the fingers fashioned from said thicker metal is displaced into said rotor recess with reference to the companion finger in its pair by an increment of the order of 0.01 inch.

3. In a shaded pole synchronous motor, the combination of a stator field structure including an annular series of pairs of pole piece fingers projecting generally radially with reference to a common axis, a hysteresis type rotor journaled to rotate on said axis and dimensioned to encircle the ends of said fingers, a shading ring also disposed concentrically with said axis, said fingers being disposed with one finger in each pair projecting outward over one side face of said shading ring and with the other finger in each pair projecting outward over the other side face of said ring and with the tip portions of all of said fingers bent transversely to overlie the periphery of said ring, whereby said tip portions of said fingers are presented in successive pairs circumferentially of the periphery of said ring, said field structure also including means for completing orbital flux paths through each of said fingers with the paths through the fingers projecting on one side of said shading ring linked with the latter and those through the fingers on the other side of said ring not linked with said ring so that only the first-mentioned fingers are shaded by said ring, and the other faces of the tip portions of said fingers which are shaded by said ring having a greater displacement outward from the periphery of the ring than the tips of the unshaded fingers.

4. In a shaded pole synchronous motor, the combination of a stator field structure including an annular series of pairs of sheet metal pole piece fingers projecting generally radially with reference to a common axis, a hysteresis type rotor journaled to rotate on said axis and dimensioned to encircle the ends of said fingers, a shading ring also disposed concentrically with said axis, said fingers being disposed with one finger in each pair projecting outward over one side face of said shading ring and with the other finger in each pair projecting outward over the other side face of said ring and with the tip portions of all of said fingers bent transversely to overlie the periphery of said ring, whereby said tip portions of said fingers are presented in successive pairs circumferentially of the periphery of said ring, said field structure also including means for completing orbital flux paths through each of said fingers with the paths through the fingers projecting on one side of said shading ring linked with the latter and those through the fingers on the other side of said ring not linked with said ring so that only the first-mentioned fingers are shaded by said ring, and the fingers which are shaded by said ring being fashioned from sheet metal of heavier gauge than the unshaded fingers, wherefore said tip portions of said shaded fingers are disposed more closely adjacent said rotor than said tip portions of said unshaded fingers.

5. In a synchronous motor, the combination of a stator core encircled by an energizing winding, pole pieces secured to the two opposite ends of said core and presenting respective first and second annular series of pairs of pole piece fingers disposed with the tip portions of the fingers in one series bordering the interior of an annular rotor recess and the tip portions of those in the other series bordering the exterior of such recess and with the pairs of fingers in the two series alternating with each other circumferentially of said recess, the fingers in one series projecting generally parallel with the longitudinal axis of said core exteriorly thereof and the fingers in the other series projecting generally radially of said axis, a first electrically conductive sheet metal shading ring apertured at circumferentially spaced points to receive the fingers of said axially extending series and slipped down over the same, and a second conductive sheet metal shading ring lying between alternate ones of the other series of fingers, the exterior diameter of one ring being substantially equal to the interior diameter of the other in order that the two may be fashioned as concentric stampings from a single piece of sheet metal.

6. In a synchronous motor, the combination of a stator core encircled by an energizing winding, pole pieces secured to the two opposite ends of said core and presenting respective first and second annular series of pairs of pole piece fingers disposed with the tip portions of the fingers in one series bordering the interior of an annular rotor recess and the tip portions of those in the other series bordering the exterior of such recess and with the pairs of fingers in the two series alternating with each other circumferentially of said recess, the fingers in one series projecting generally parallel with the longitudinal axis of said core exteriorly thereof to form the outer annulus of poles and the fingers in the other series projecting generally radially of said axis to form the inner annulus of poles, a first electrically conductive sheet metal shading ring of flat configuration apertured at circumferentially spaced points to receive the fingers of said axially extending series and slipped down over the same, and a second conductive sheet metal shading ring of flat configuration lying between alternate ones of the other series of fingers, the exterior diameter of said second ring being slightly less than the interior diameter of said first shading ring in order that the two rings may be fashioned as concentric stampings from a single piece of sheet metal.

7. In an electric motor, a field structure presenting an annular series of pairs of sheet metal pole piece fingers with the outside surfaces of said fingers forming the inside border of a rotor recess, a second annular series of pairs of sheet metal pole piece fingers with the inside surfaces of said fingers forming the outside border of said rotor recess with the surface adjacent said rotor recess of one finger of each pair of both the inner and outer series being displaced into said rotor recess with reference to the surface of the companion finger in its pair by an increment of the order of 0.01 inch and means to shade only the one finger of each pair that has the surface so displaced.

8. In an electric motor, a field structure presenting an annular series of pairs of pole piece fingers the outside surfaces of said fingers forming the inside border of a rotor recess, a second annular series of pairs of pole piece fingers, the inside surfaces of said fingers forming the outside border of said rotor recess, a rotor adapted to revolve in said rotor recess, the surface nearest the rotor of one pole piece finger of each pair of both series being positioned closer to said rotor than the surface of its companion finger and means to shade only the one finger of each pair having a surface positioned closer to the rotor.

9. In an electric motor, a field structure presenting an annular series of pairs of sheet metal pole piece fingers, the inner surfaces of said fingers forming a rotor recess, with one finger of each pair being bent and thereby displaced from said rotor recess with reference to its companion finger and means to shade only the pole piece fingers that are not displaced from said rotor recess.

10. In an electric motor, a field structure presenting an annular series of pairs of sheet metal pole piece fingers bordering the inside of a rotor recess and displaced with their tip portions in edge-to-edge relation to each other in a direction circumferential of the series, one finger in each pair being fashioned from sheet metal of a heavier gauge than that from which the other finger in such pair is fashioned, and all of said fingers being positioned with the inner faces of said tip portions lying in a single circle, whereby the outer face of said tip portion of each of the fingers fashioned from said heavier gauge metal is displaced into said rotor recess with reference to the companion finger in its pair by an increment equal to the difference in thickness of the fingers and a second annular series of pairs of pole piece fingers bordering the outside of said rotor recess with one finger of each pair being bent away from said rotor recess with reference to the companion finger in its pair by an increment of the order of 0.01 inch.

11. The method of making a field structure for an electric motor including forming of sheet metal a cup shaped structure presenting an annular series of pairs of pole piece fingers with the inner surfaces of said fingers forming a rotor recess, placing a sheet metal shading ring having a close fitting aperture for each finger over said fingers to support said fingers near their extremities, said shading rings being adapted to shade only one of each pair of said fingers and then bending the ends of the unshaded one of each pair of fingers away from said rotor recess so that the inner surfaces of the ends of said bent fingers are displaced from said recess in relation to the inner surface of the other finger of each pair.

MAX E. SCHLENKER.
PAUL W. RYBURN.

REFERENCES CITED

The following references are of record in the file of this patent:

UNITED STATES PATENTS

| Number | Name | Date |
| --- | --- | --- |
| 1,873,397 | Hammond | Aug. 23, 1932 |
| 1,884,140 | Nickle | Oct. 25, 1932 |
| 1,957,275 | Lenehan | May 1, 1934 |
| 1,961,975 | Lenehan | June 5, 1934 |
| 2,128,719 | Thompson | Aug. 30, 1938 |
| 2,234,420 | Traeger | Mar. 11, 1941 |
| 2,292,265 | Carpenter | Aug. 4, 1942 |
| 2,374,347 | Hansen et al. | Apr. 24, 1945 |